(12) United States Patent
Schwochert et al.

(10) Patent No.: US 6,739,655 B1
(45) Date of Patent: May 25, 2004

(54) RECREATIONAL VEHICLE SEAT WITH STORAGE POCKET

(75) Inventors: Jeffrey F. Schwochert, Osceola, WI (US); Kathryn L. Johnson, Glenwood City, WI (US); Paul Pueschner, Dresser, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/376,862

(22) Filed: Feb. 28, 2003

(51) Int. Cl.[7] .................................................. B62J 1/00
(52) U.S. Cl. .............................. 297/195.12; 297/188.01
(58) Field of Search ........................ 297/195.1, 195.12, 297/214, 188.01, 188.08, 188.1, 188.19, 188.2

(56) References Cited

U.S. PATENT DOCUMENTS

| | | | | |
|---|---|---|---|---|
| 5,040,632 A | * | 8/1991 | Fujii et al. ................... 180/219 |
| 5,722,717 A | * | 3/1998 | Rettenberger ............. 297/188.1 |
| 5,927,800 A | * | 7/1999 | Stallworth .............. 297/188.08 |
| 5,944,380 A | | 8/1999 | Atherley ................... 297/195.1 |
| 6,086,149 A | | 7/2000 | Atherley ................... 297/195.1 |
| 6,109,217 A | | 8/2000 | Hedlund et al. .......... 123/41.01 |
| 6,276,290 B1 | | 8/2001 | Yamada et al. ........... 114/55.51 |
| 6,371,233 B2 | | 4/2002 | Ishii ............................ 180/182 |
| 6,450,571 B1 | | 9/2002 | Canni et al. ............ 297/188.04 |
| 6,523,634 B1 | | 2/2003 | Gagnon et al. .............. 180/291 |
| 6,585,317 B1 | * | 7/2003 | Atherley ................. 297/195.11 |

OTHER PUBLICATIONS

Photograph #1: Side View of Boss Seat; taken by Raymond Russell on Nov. 21, 2003.
Photograph #2: View from rear and above of Boss Seat, showing zippered access to Storage Cavity; taken by Raymond Russell on Nov. 21, 2003.
Photograph #3: View from bottom of Boss Seat, unzipped to reveal Storage Cavity; taken by Raymond Russell on Nov. 21, 2003.
Photograph #4: Close up view of Boss Seat Storage Cavity; taken by Raymond Russell on Nov. 21, 2003.
Photograph #5: Angled Close up view of Boss Seat Storage; taken by Raymond Russell on Nov. 21, 2003.

* cited by examiner

*Primary Examiner*—Peter R. Brown
(74) *Attorney, Agent, or Firm*—Fredrikson & Byron, P.A.

(57) ABSTRACT

A recreational vehicle comprising a seat with a storage pocket for transporting items is disclosed. The recreational vehicle may be a snowmobile, watercraft, all-terrain vehicle, or other similar small vehicle intended for entertainment and transportation. The vehicles is provided with a seat which typically comprises a sturdy and resilient frame which supports one or more cushioning layers, and an outer cover. The vehicle seat contains a cavity which serves as a storage compartment. The seat cover contains a pocket which inserts into the storage compartment to serve as a readily removable liner. The pocket is covered with a lid which can be reversibly closed over the pocket opening.

20 Claims, 6 Drawing Sheets

RECREATIONAL VEHICLE SEAT WITH STORAGE POCKET

FIELD OF THE INVENTION

This invention relates generally to a storage compartment liner for use in the seat of recreational vehicles. More particularly, the present invention relates to a storage pocket for use in the seat trunk of snowmobiles.

BACKGROUND OF THE INVENTION

Recreational vehicles such as snowmobiles, watercraft, and all-terrain vehicles typically benefit from the provision of some sort of storage compartment to enable the riders to transport additional small items. The storage compartment provides a location in which various items can be stored while moving from one location to another, without further burdening the rider. These storage compartments can be located in various portions of the vehicle. U.S. Pat. No. 6,276,290 discloses an expanded storage compartment for watercraft which takes advantage unused space within the interior of the bow for additional storage space. U.S. Pat. No. 6,523,634 discloses an all terrain vehicle in which a storage compartment is provided over the front wheels of the vehicle. U.S. Pat. No. 6,371,233 discloses a lighted snowmobile storage compartment in the rear portion of the seat. Various attachable storage devices have been described as well.

Relative to other motor vehicles, recreational vehicles are often driven over rougher terrain and with greater exposure to the elements. These conditions can make it difficult to safely store items being carried, as they become exposed to the elements and/or subject to breakage as they impact on the sides of the storage compartment. Ice, dirt, seawater, or various other contaminants may find their way into the storage compartment, damaging or soiling the items carried within. For snowmobiles in particular, the trunk is often in communication with the trunk compartment via an air passage. Although such trunks are typically sealed, the seat is typically made of a compressible foam material which compresses when a rider sits, driving air out of the foam and into the trunk compartment where it may break the seal with the lid of the trunk. Alternately, when the rider stands up, the seat draws air out of the storage compartment, creating a vacuum which can suck in melted snow or other items.

Another problem with existing storage compartments for recreational vehicles is that they are not particularly well designed for cleaning and easy retrieval of items stored within. This is due, in part, to the fact that recreational vehicles are often relatively small, with little excess space. Storage space is provided wherever found, and may often be irregular in shape and contain cracks and crevices in which items or debris may become lodged. Difficulty of item retrieval is further exacerbated by the fact that the vehicle operator may be wearing gloves for protection from the elements, and may be attempting to retrieve items in darkness or under inclement weather conditions which reduce visibility.

SUMMARY OF THE INVENTION

Accordingly, the storage pocket of the present invention provides a device which can be used to improve reliability, accessibility, and cleanliness of a variety of spaces used for storage in recreational vehicles. More specifically, the present invention provides a recreational vehicle seat with a storage compartment which is lined with a pocket. This pocket serves to protect items stored within from the elements and from damage from the sides of the storage compartment. Furthermore, the storage pocket improves the accessibility of enclosed items by forming a space which is easily searched and one which prevents items from becoming lodged or escaping through cracks or crevices within the storage space. The storage pocket may also be provided with a cover lid. For these and other reasons, the storage pocket improves the cleanliness of the storage space, by avoiding the uptake of debris and by making the removal of such debris simpler. Finally, the pocket hides from view the raw edges of the material used to form the storage space, such as vinyl and foam, providing a space which is more aesthetically appealing.

One aspect of the present invention involves a snowmobile seat for a snowmobile, comprising a resilient seat frame configured for removably mounting the seat on a snowmobile; a flexible seat cushion having a lower surface on the seat frame and an upper surface on which a rider may sit, the seat cushion forming a cavity usable as a storage space; a cover comprised of a water-resistant material, the cover covering the flexible seat cushion and fastening to the seat frame, the cover having a lid that selectively covers the cavity; and a storage pocket mounted within the cavity and opening towards the lid.

In a preferred embodiment, the storage pocket may open at an upper end, the upper end being fastened to the cover. The upper end of the pocket may be positioned under a lid in order to retain and protect the contents of the pocket. Preferably, the seat cushion contains a lower layer of closed cell foam and an upper layer of open cell foam. The cavity is preferably formed in the lower layer. The seat and pocket may be formed from a variety of materials. However, using closed cell foam formed of expanded polypropylene, open cell foam formed of polyurethane foam, a frame formed of plastic, and a storage pocket formed of nylon fabric are all preferred embodiments. The storage pocket may be attached to the seat through a variety of means, but a preferred method is to stitch it to the cover. Optionally, the bottom interior of the storage pocket may be provided with an internal loop which allows the storage pocket to be pulled out of the cavity by means of the loop.

A further aspect of the present invention involves a snowmobile having a storage trunk, comprising a longitudinally extending chassis including a front portion and a rear portion, the rear portion having an endless drive track disposed therein, with the rear portion defining an operator seat area. In this aspect, the front portion mounts a pair of steerable skis. A straddle-type seat mounted on the chassis at the operator seat area, the seat having a flexible seat cushion, the flexible seat cushion having an upper surface on which a rider may sit, and the seat cushion forming a cavity open on its outer surface and usable as a storage space. In this embodiment, a cover comprised of a water-resistant material is provided, the cover covering the flexible seat cushion, and the cover has a lid that selectively covers the open end of the cavity. Finally, this embodiment possesses a storage pocket mounted within the cavity and opening towards the lid.

BRIEF DESCRIPTION OF THE DRAWINGS

The invention will now be described by way of example with reference to the accompanying drawings wherein.

DETAILED DESCRIPTION OF THE PREFERRED EMBODIMENT

Figure 1:
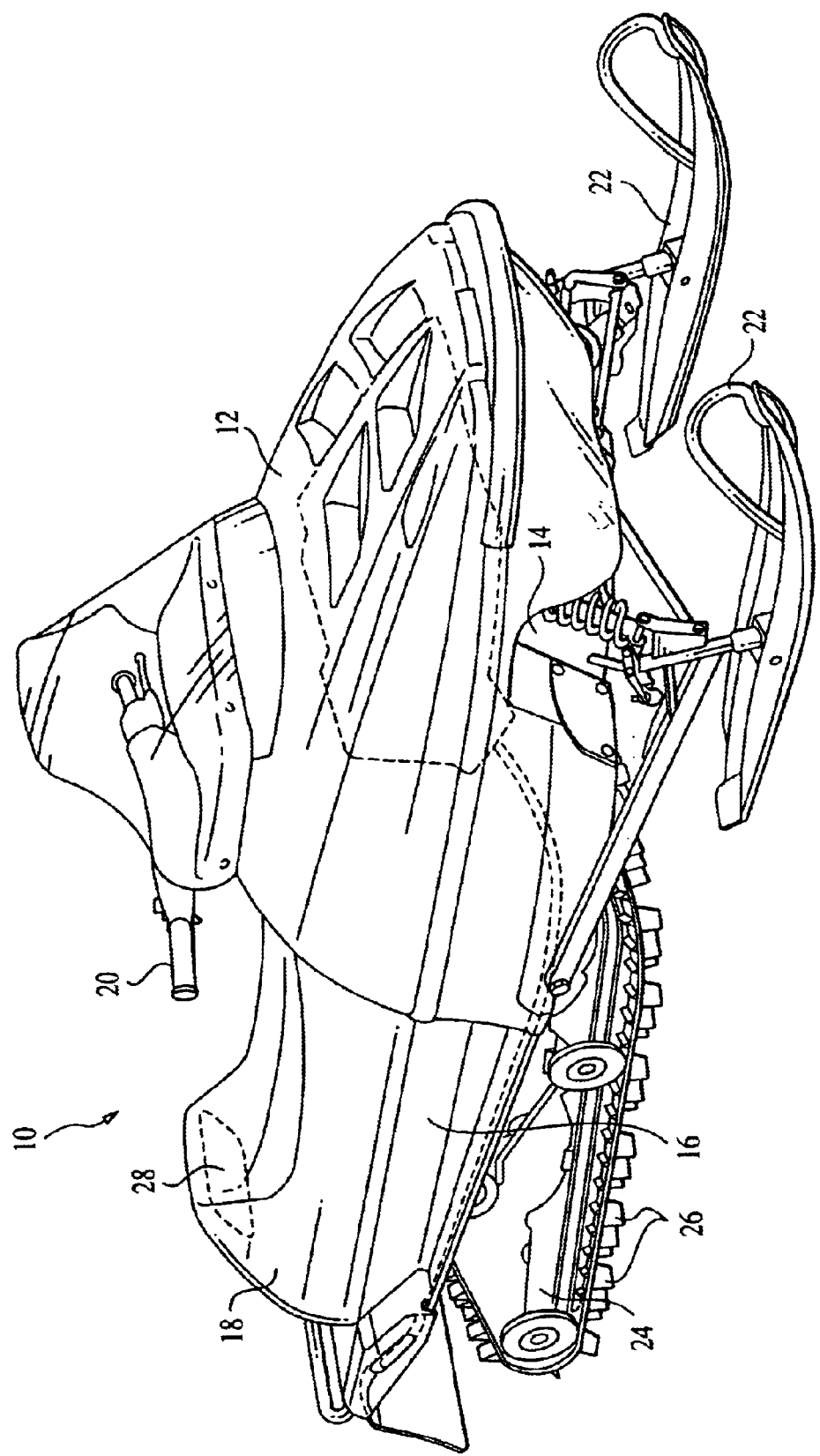
FIG. 1 is a perspective view of a snowmobile having a storage pocket in accordance with one embodiment of the invention.

With reference to the drawings, the snowmobile 10 portrayed is an exemplary recreational vehicle. Although the present invention will be shown and described in the context of the illustrated snowmobile, some aspects and features of the present invention can also be employed with other vehicles such as motorcycles, watercraft, all-terrain vehicles, and the like, in a manner that would be apparent to those skilled in the art.

The drawings depict preferred embodiments of a snowmobile and snowmobile seat incorporating the storage pocket of the invention. It will be understood, however, that many of the specific details of the snowmobile with a storage pocket illustrated in the drawings could be changed or modified by one of ordinary skill in the art without departing significantly from the spirit of the invention.

A snowmobile 10 having a storage pocket in accordance with one embodiment of the invention is illustrated in FIG. 1. The snowmobile 10 includes a body assembly 12 made up of a number of parts which may be formed of suitable materials, such as plastic or synthetic resin, that cover and protect a support frame or chassis 14. The body 12 further includes a rear body portion 16 that accommodates a seat 18 adapted to seat one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14.

Rearwardly of the front skis 22 and beneath the seat 18, the chassis 14 suspends an endless track assembly 24 by a suitable suspension. The endless track 24 has a plurality of spaced ribs 26 which extend from the exterior surface of the track. These ribs 26 not only provide traction to the endless track 24 but may also assist the operation of the cooling system. The endless track 24 is driven by an internal combustion engine that is supported by the chassis 14 and located in an engine compartment within the body 12 towards the front of the snowmobile 10. The storage compartment 28 is present in this embodiment at the rear of the seat, as will be shown in more detail in FIGS. 2–6.

Figure 2:
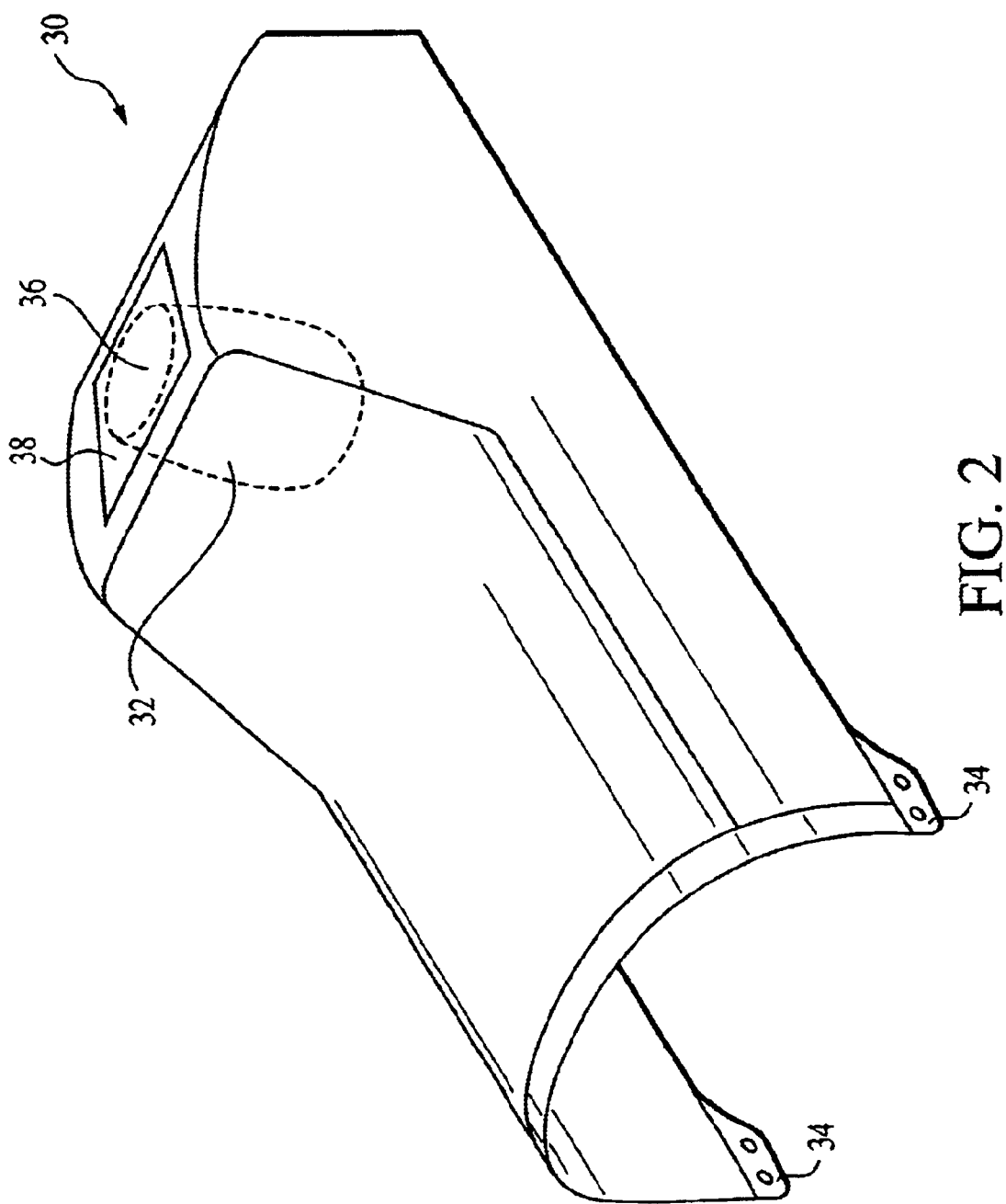
FIG. 2 is a perspective view of a preferred embodiment of the vehicle seat cover having a storage pocket of the present invention.

A perspective view of a preferred embodiment of the seat cover 30 having a storage pocket 32 of the present invention is shown in FIG. 2. The seat cover 30 is designed to slip over the outside of the seat 18, and is preferably constructed of vinyl. On one or both sides of the seat cover are attachment points 34 which use buttons to help secure the seat cover 30 to the seat 18. In one embodiment, the seat cover 30 is primarily secured to the seat 18 by means of staples along the outer edge of the seat cover, which are fired into the frame 40, though a variety of other means of attachment know to those skilled in the art may be used. The storage pocket 32 is attached to the storage opening 36 to form a pocket which rests within the storage compartment 28 of the seat 18. The storage pocket 32 is preferably attached to the storage opening 36 of the seat 18 by stitching. The storage pocket 32 can be made of a variety of materials. Preferably it is made of a flexible material which durable, water resistant, and capable of occupying the majority of the available storage space. A particularly preferred material for this use is denier nylon, which is flexible, water-resistant, and highly durable. The storage pocket 32 may also be provided with various loops or other attachment devices in order to carry items (e.g. tool kits, maps, spark plugs) fixed to the inner surface of the storage pocket 32.

The storage opening 36 is preferably covered with a lid 38. The lid 38, or flap, is designed to cover the storage opening 36 and to keep out foreign material while retaining any items placed within the storage pocket 32. The lid 38 may be permanently attached to the seat cover 30 along one edge, typically by stitching, and reversibly attached in order to keep it closed by means of hook and loops, Velcro™, buttons, or a variety of other attachment devices, in which case the lid is most easily envisioned as a flap. Alternately, the lid 38 may screw onto the opening, or be otherwise reversibly attached. When the lid 38 resembles a flap, it is typically comprised of the same material used for the rest of the seat cover 30.

Figure 3:
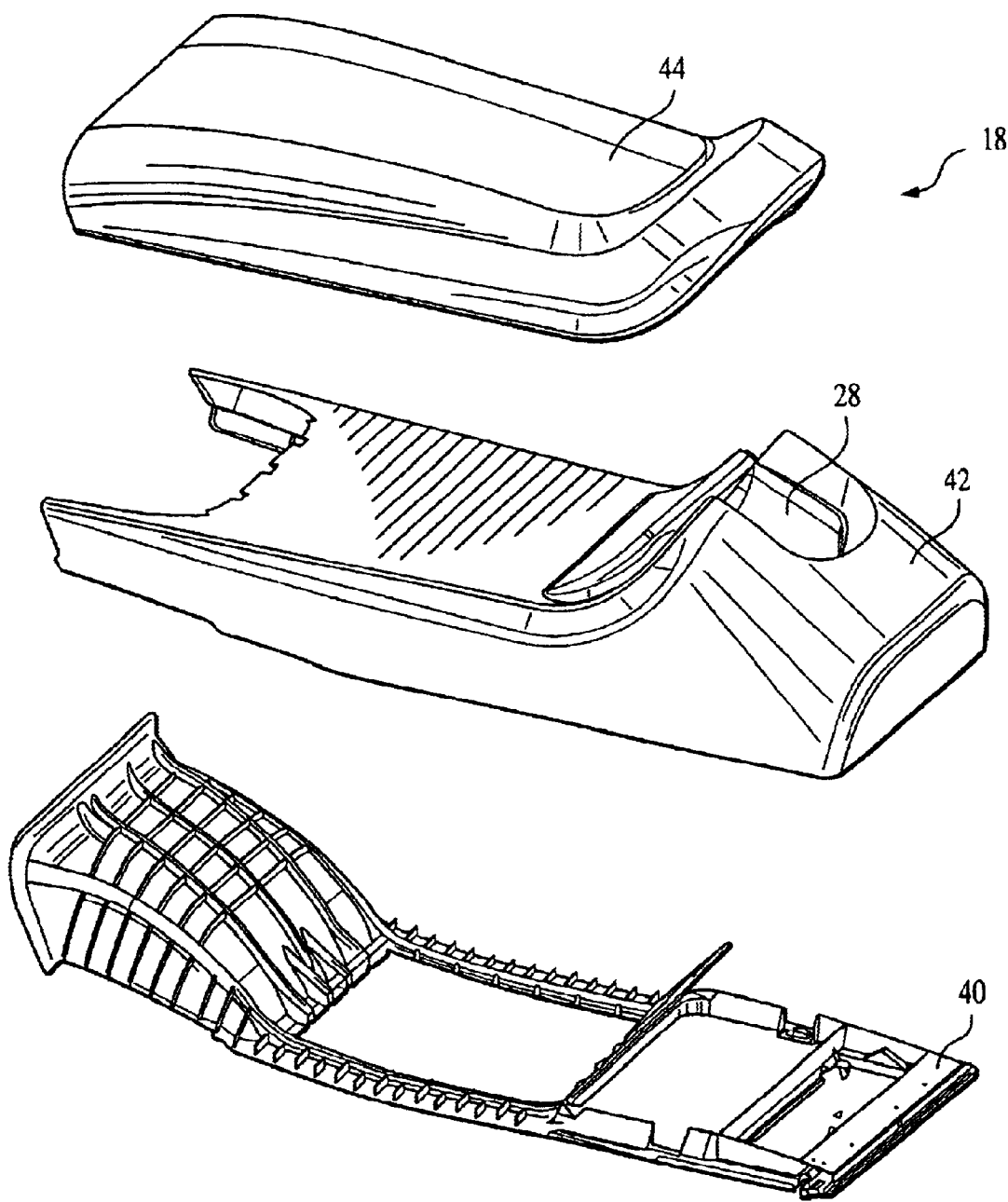
FIG. 3 is an exploded view showing the various components making up a vehicle seat having a storage pocket of the present invention.

FIG. 3 shows an exploded view of a vehicle seat 18, showing the various components that make up the vehicle seat in one preferred embodiment. The bottom component of the seat is the frame 40, which provides support and structure for the seat. In some arrangements, the frame 40 is formed from metals such as steel or aluminum. In other, more lightweight arrangements, the frame 40 can be formed from resin materials such as thermoplastics. The frame is generally concave and forms a trough in which a saddle-shaped seat assembly comprising the seat cushion portions are supported. The frame 40 is positioned over an opening in the body of the snowmobile 10 and is secured in position in any suitable manner. In a preferred embodiment, the frame 40 is attached to the chassis of the vehicle in the front using two tongues that fit under the gas tank, while two self tapping fasteners are used to secure the frame 40 at the rear of the vehicle.

Adjacent to and above the frame 40 is the lower seat cushion 42. The lower seat cushion 42 is preferably formed of a material which provides structure and support, but will compress slightly under pressure to increase rider comfort. A preferred material exhibiting these characteristics is a closed cell foam formed of expanded polypropylene. Alternately, an open cell expanded polyethelene foam may be used, particularly in some high performance racing vehicles. The lower seat cushion 42 is generally rectangular in shape, with an elevated rear portion that serves as a back support and to help the rider remain on the vehicle during acceleration. The bottom surface of the lower seat cushion is adapted to conform to the upper surface of the frame 40. In the embodiment shown in FIG. 3, the storage compartment 28 is housed within the rear portion of the lower seat cushion 42.

While the storage compartment 28 is shown in the figures as being at the rear portion of the top of the seat, the present invention is by no means limited to such location, and may be located at any suitable space upon the vehicle seat 18 where space is available and accessible to the rider, including the rear, sides, front, etc.

Adjacent to and above the lower seat cushion 42 is the upper seat cushion 44. The upper seat cushion 44 is provided primarily to increase rider comfort, and is preferably formed of a readily compressible open cell foam such as polyurethane foam. The upper seat cushion is preferably a rectangular, lozenge shape adapted to fit over the lower seat cushion 42 while providing a comfortable support surface for human riders. Note that the seat cover 30 with storage pocket 32, described above, will be wrapped over the structure shown in FIG. 3, with the storage pocket positioned to rest within storage compartment 28, to provide the vehicle seat with storage pocket of the present invention.

Figure 4:
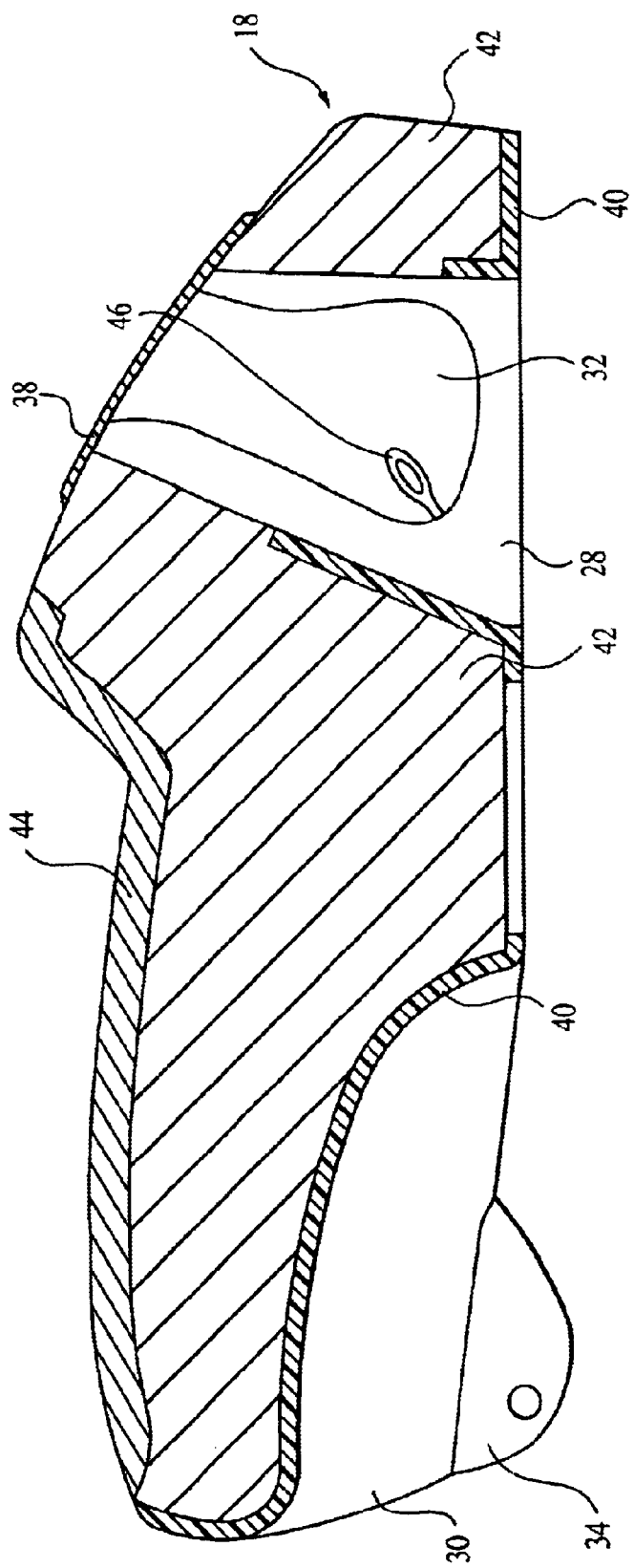
FIG. 4 is a section view schematic of an embodiment of the vehicle seat using two types of cell foam, where the storage compartment is formed within the cell foam.
Figure 5:
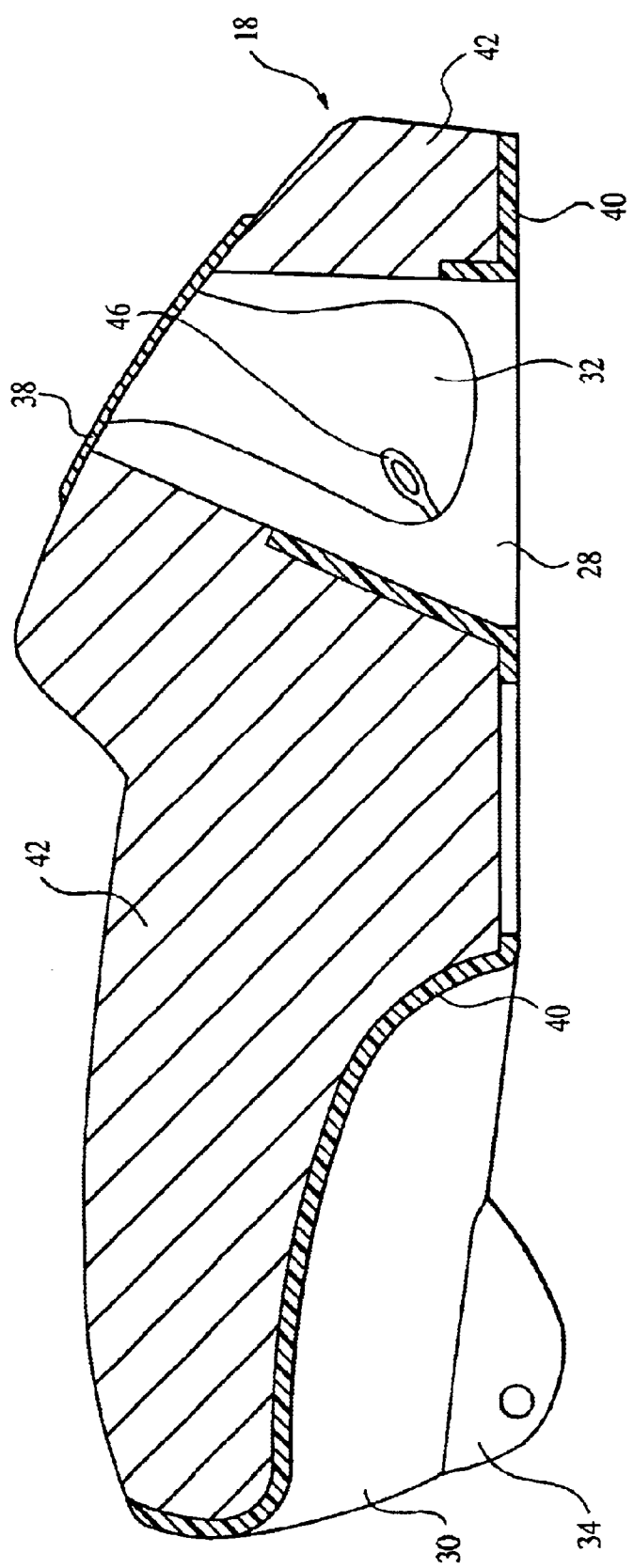
FIG. 5 is a section view schematic of an embodiment of the vehicle seat using a single type of cell foam, where the storage compartment is formed within the cell foam.
Figure 6:
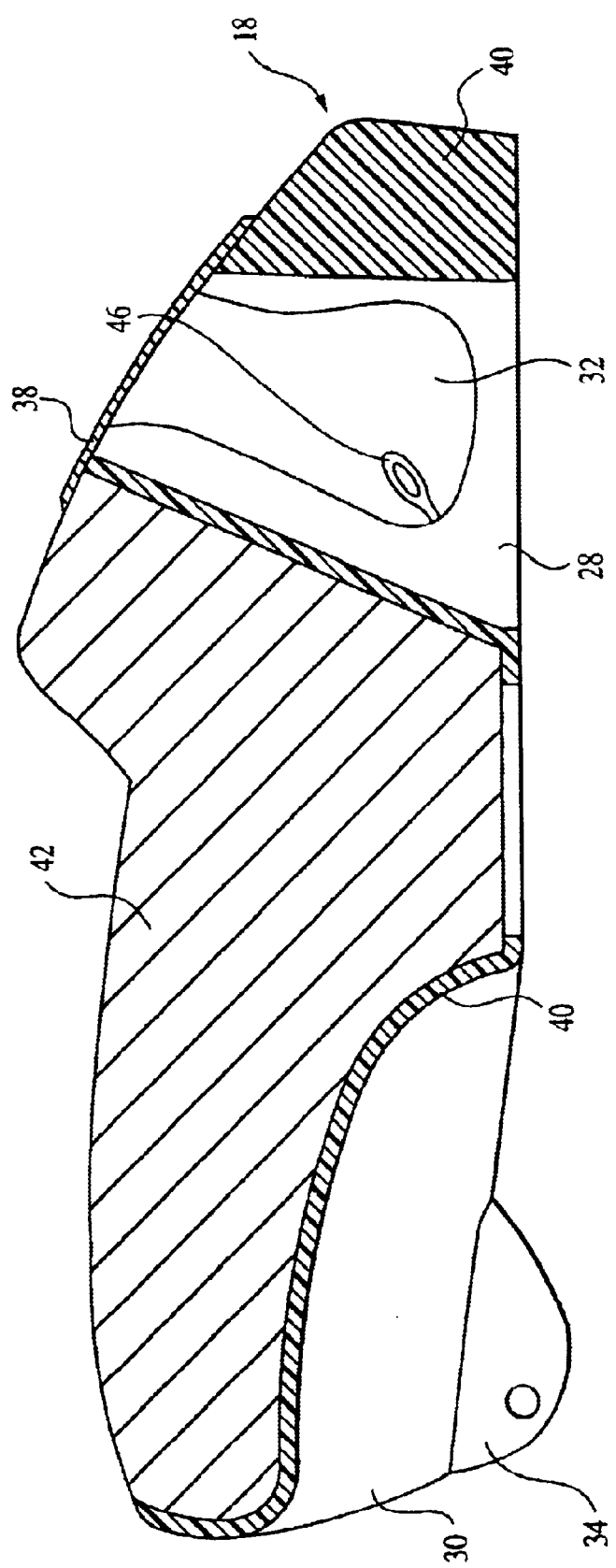
FIG. 6 is a section view schematic of an embodiment of the vehicle seat using a single type of cell foam, where the storage compartment is formed within the seat frame.

Remaining FIGS. 4, 5, and 6 illustrate different embodiments of the vehicle seat 18 shown in FIG. 3. A schematic sectional view is employed to illustrate the materials used to form various embodiments of the present invention. FIG. 4 illustrates the embodiment shown in FIG. 3, in which the vehicle seat comprises a frame 40 which supports a lower seat cushion 42, which in turn supports an upper seat cushion 44. In this embodiment, the cavity which forms the storage compartment 28 is formed within the lower seat cushion 42. The cavity can vary considerably in size and shape, and is may in some cases be nothing more than a gap between components that is of a size sufficient to be useful for holding items such as food or keys. The seat cover 30 overlays the vehicle seat 18, and is positioned such that storage pocket 32 rests within the storage compartment 28. The storage pocket 32 is covered by a lid 38, which is held closed by a reversible attachment device. Also shown is loop 46 within the storage pocket 32. This loop 46 is preferably attached to the lower portion of the storage pocket 32 to enable easy and thorough cleaning and emptying of the storage pocket 32 by pulling on the loop to pull the storage pocket out of the seat cover 18 through opening 36.

Alternate embodiments of the vehicle seat 18 are shown in FIG. 5 and FIG. 6. These embodiments have all of the characteristics described in FIG. 4, except for the noted differences. The vehicle seat 18 shown in FIG. 5 differs from that described above for FIG. 4 in that it lacks the upper seat cushion 44, and instead consists of a lower seat cushion 42 placed over a frame 40. The storage compartment 28 is again formed within the lower seat cushion 42. The lower seat cushion 42 could be formed of open cell foam or closed cell foam as discussed above.

In FIG. 6, a single seat cushion, i.e. a lower seat cushion 42, is again used, as in FIG. 5, but in this embodiment the frame 40 of the vehicle seat 18 forms the storage compartment 28.

In yet another embodiment not specifically shown, the frame 40 embodiment shown in FIG. 6 could be used with the dual layer seat cushions (lower seat cushion 42 and upper seat cushion 44) shown in FIG. 4.

In yet another embodiment, the frame 40 in FIGS. 4 and 5 could be eliminated, provided that the seat 18 is mounted to the snowmobile chassis in any alternate manner known in the art (e.g., snaps, hook and loops, adhesive, etc.). In such an embodiment, the lower cushion 42 would mount on top of the chassis.

A recreational vehicle and a recreational seat arranged and configured in accordance with certain features, aspects, and advantages of the present invention provides a lined storage space which can be used to safely store various items needed by the rider of the vehicle. Through inclusion of a storage pocket 32 made of sturdy and water-resistant material, items are prevented from becoming lost within the often irregularly shaped storage compartment 28, and can be easily retrieved by hand or by removing the storage pocket 32 from the storage compartment 28 through use of an easily found and graspable pull device provided within the pocket, such as a loop 46. The storage pocket 32 and the lid 38 also serve to keep the items stored clean and minimize damage caused by movement within the storage compartment 32 during transportation. The presence of a storage pocket 32 also prevents exposure of the raw edges of the materials used to form the seat, which has aesthetic advantages.

Although the present invention has been described in terms of certain preferred embodiments, other embodiments apparent to those of ordinary skill in the art are also within the scope of this invention. Thus, it should be understood that various changes, adaptations, and modifications may be made therein without departing from the spirit of the invention of the appended claims.

What is claimed is:

1. A snowmobile seat for a snowmobile, comprising:
   a resilient seat frame configured for removably mounting the seat on a snowmobile;
   a flexible seat cushion having a lower surface on the seat frame and an upper surface on which a rider may sit, the seat cushion forming a cavity usable as a storage space, the cavity having an opening on an outer surface of the seat cushion;
   a cover comprised of a water-resistant material, the cover covering the flexible seat cushion and fastening to the seat frame, the cover having a lid that selectively covers the opening of the cavity; and
   a flexible storage pocket mounted within the cavity and having a single opening towards the lid.

2. The snowmobile seat of claim 1, wherein the storage pocket opens at an end, the end being fastened to the cover.

3. The snowmobile seat of claim 1, wherein the end of the storage pocket is positioned under the lid.

4. The snowmobile seat of claim 1, wherein the seat cushion includes a lower layer of closed cell foam and an upper layer of open cell foam.

5. The snowmobile seat of claim 4, wherein the cavity is formed in the lower layer.

6. The snowmobile seat of claim 5, wherein the open cell foam is formed of polyurethane foam.

7. The snowmobile seat of claim 4, wherein the closed cell foam is formed of expanded polypropylene.

8. The snowmobile seat of claim 1, wherein the storage pocket is formed of nylon fabric.

9. The snowmobile seat of claim 1, wherein the frame is formed of plastic.

10. The snowmobile seat of claim 1, wherein the storage pocket is stitched to the cover.

11. The snowmobile seat of claim 1, wherein a bottom interior of the storage pocket has an internal loop, whereby the storage pocket may be pulled out of the cavity by the loop.

12. A snowmobile having a storage trunk, comprising:
   a longitudinally extending chassis including a front portion and a rear portion, the rear portion having an endless drive track disposed therein, the rear portion defining an operator seat area, the front portion mounting a pair of steerable skis,
   a straddle-type seat mounted on the chassis at the operator seat area, the seat having a flexible seat cushion, the flexible seat cushion having an upper surface on which a rider may sit, the seat cushion forming a cavity open to an outer surface of the seat cushion and usable as a storage space;

a cover comprised of a water-resistant material, the cover covering the flexible seat cushion, the cover having a lid that selectively covers the opening of the cavity; and a flexible storage pocket mounted within the cavity and having a single opening towards the lid.

13. The snowmobile of claim 12, wherein the seat cushion includes a lower layer of closed cell foam and an upper layer of open cell foam.

14. The snowmobile of claim 13, wherein the cavity is formed in the lower layer.

15. The snowmobile of claim 13, wherein the closed cell foam is formed of expanded polypropylene.

16. The snowmobile of claim 14, wherein the open cell foam is formed of polyurethane foam.

17. The snowmobile of claim 12, wherein the storage pocket is formed of nylon fabric.

18. The snowmobile of claim 12, wherein the seat includes a frame.

19. The snowmobile of claim 12, wherein the storage pocket is stitched to the cover.

20. The snowmobile of claim 12, wherein a bottom interior of the storage pocket has an internal loop, whereby the storage pocket may be pulled out of the cavity by the loop.

* * * * *